(12) United States Patent
Carlisi

(10) Patent No.: US 6,588,369 B2
(45) Date of Patent: Jul. 8, 2003

(54) WASTE TRANSFER DEVICE FOR KITTY LITTER BOX

(76) Inventor: Angelo Carlisi, 1600 Mystic Hill Dr., Milford, MI (US) 48380

(*) Notice: Subject to any disclaimer, the term of this patent is extended or adjusted under 35 U.S.C. 154(b) by 0 days.

(21) Appl. No.: 10/151,223

(22) Filed: May 20, 2002

(65) Prior Publication Data

US 2002/0134314 A1 Sep. 26, 2002

Related U.S. Application Data

(63) Continuation-in-part of application No. 09/955,637, filed on Sep. 18, 2001, now abandoned, which is a continuation of application No. 09/441,849, filed on Nov. 17, 1999, now Pat. No. 6,289,847.

(51) Int. Cl.[7] .............................................. A01K 1/035
(52) U.S. Cl. ....................................................... 119/166
(58) Field of Search ................................ 119/166, 161, 119/163, 165, 168

(56) References Cited

U.S. PATENT DOCUMENTS

| | | |
|---|---|---|
| 1,268,450 A | 6/1918 | Gauntt |
| 1,711,004 A | 4/1929 | Youngman |
| 2,751,061 A | 6/1956 | Nickerson |
| 3,033,348 A | 5/1962 | Andrew |
| 3,774,754 A | 11/1973 | Hedlund |
| 4,096,827 A | 6/1978 | Cotter |
| 4,117,804 A | 10/1978 | Moore et al. |
| 4,120,264 A | 10/1978 | Carter |
| 4,190,525 A | 2/1980 | Menzel |
| 4,325,325 A | 4/1982 | Larter |
| 4,325,822 A | 4/1982 | Miller |
| 4,465,018 A | 8/1984 | Mopper |
| 4,493,288 A | 1/1985 | van der Kolk |
| 4,574,735 A | 3/1986 | Hohenstein |
| 4,844,011 A * | 7/1989 | Strickland .................... 119/164 |
| 4,846,104 A | 7/1989 | Pierson, Jr. |
| 4,854,267 A | 8/1989 | Morrow |
| 4,934,317 A | 6/1990 | Pourshalchi |
| 5,003,920 A * | 4/1991 | Miksitz ...................... 119/163 |
| 5,048,464 A | 9/1991 | Shirley |
| 5,048,465 A | 9/1991 | Carlisi |
| 5,107,797 A | 4/1992 | LaRoche |
| 5,178,099 A | 1/1993 | Lapps et al. |
| 5,184,575 A * | 2/1993 | Reinartz ...................... 119/163 |
| 5,188,062 A * | 2/1993 | Joy et al. ..................... 119/164 |
| 5,226,388 A | 7/1993 | McDaniel |
| 5,259,340 A | 11/1993 | Arbogast |
| 5,267,530 A | 12/1993 | Zamoyski |
| 5,394,833 A | 3/1995 | Glass |
| 5,460,122 A | 10/1995 | Reinartz |
| 5,477,812 A | 12/1995 | Waters |
| 5,509,379 A | 4/1996 | Hoeschen |
| 5,544,620 A | 8/1996 | Sarkissian |
| 5,592,900 A | 1/1997 | Kakuta |
| 5,662,066 A | 9/1997 | Reitz |
| 5,673,648 A | 10/1997 | Ayle |
| 5,678,508 A | 10/1997 | Butzen |
| 5,749,318 A | 5/1998 | Barbot et al. |
| 5,752,465 A | 5/1998 | Page |
| 5,823,137 A | 10/1998 | Rood et al. |
| 5,931,119 A * | 8/1999 | Nissim et al. ............... 119/163 |

FOREIGN PATENT DOCUMENTS

| | | | |
|---|---|---|---|
| EP | 0 297 015 B1 | 6/1988 | |
| FR | 2690606 | * 5/1993 | .......... A01K/1/035 |

* cited by examiner

Primary Examiner—Yvonne Abbott
(74) Attorney, Agent, or Firm—Brooks & Kushman P.C.

(57) ABSTRACT

A device for transporting and storing solid animal waste collected from a self cleaning kitty litter box and replenishing litter within the box. Replacement litter storage is positioned above the box. A mechanism releases predetermined amounts of litter into the box during cycling of a rake that cleans the box. A collection member has a first position where it receives waste collected by the rake. The collection member is disposed between the storage member and the box and at a second position transfers the waste to the storage member. A drive mechanism is mounted to the collection member moves it between the first position and the second position. The combined members in conjunction with the self cleaning litter box provide a litter box that needs no maintenance over long periods.

12 Claims, 11 Drawing Sheets

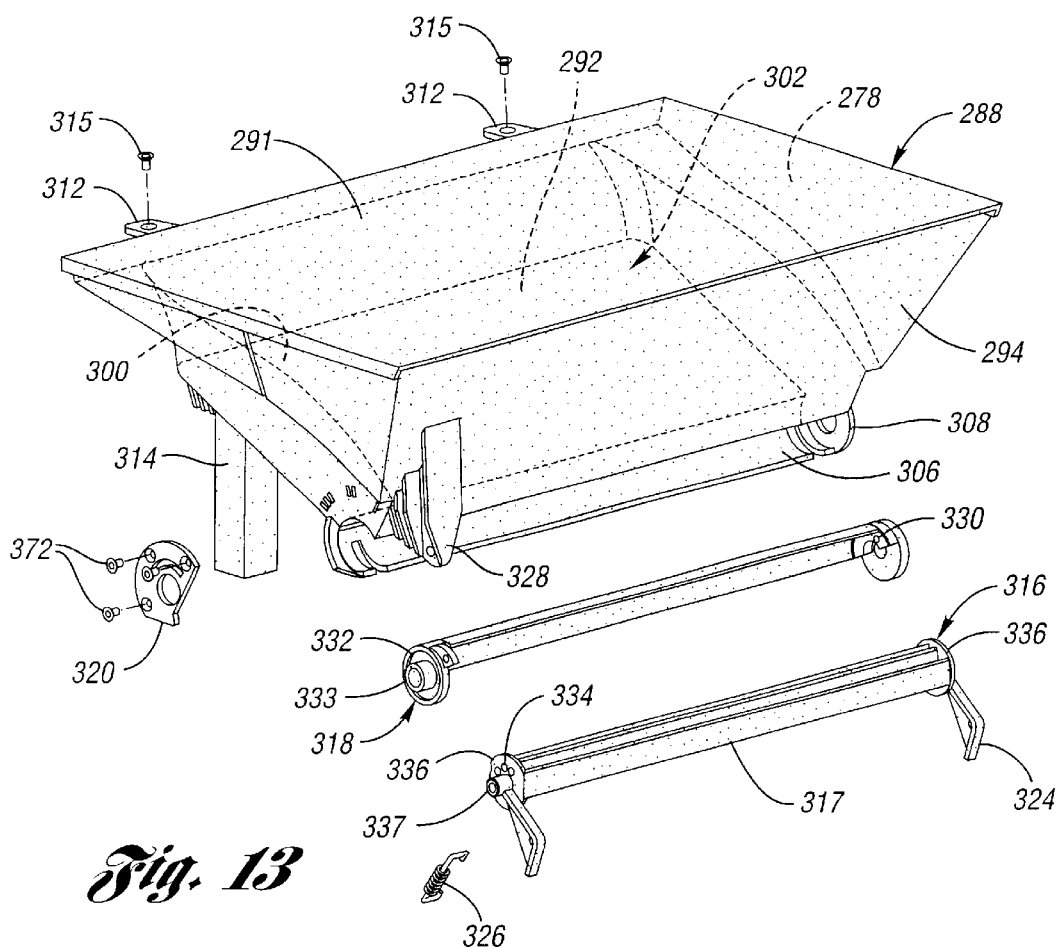
Fig. 13
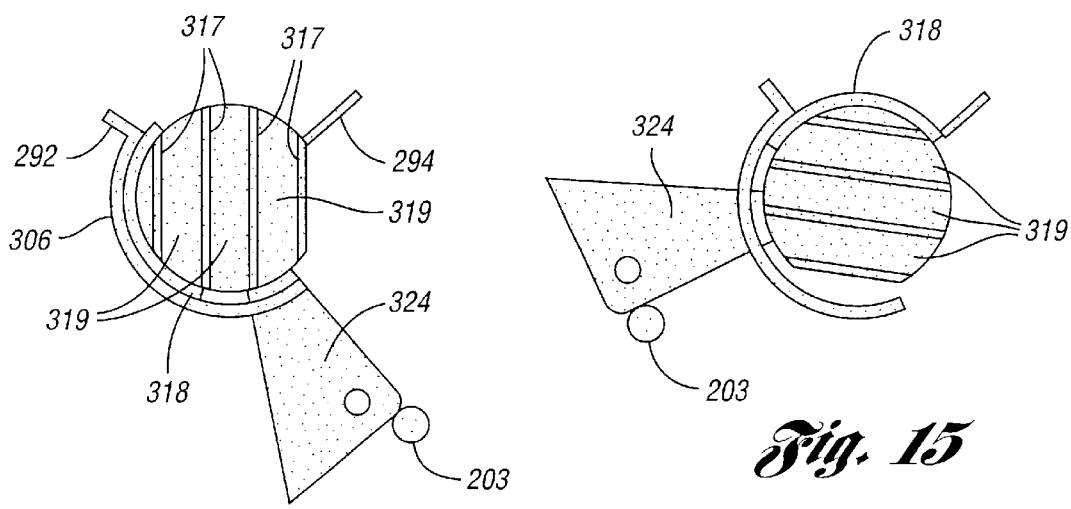
Fig. 14
Fig. 15

WASTE TRANSFER DEVICE FOR KITTY LITTER BOX

CROSS-REFERENCE TO RELATED APPLICATIONS

This application is continuation-in-part of U.S. application Ser. No. 09/955,637 filed Sep. 18, 2001 now abandoned, which was a continuation of U.S. application Ser. No. 09/411,849 filed Nov. 17, 1999, which issued on Sep. 18, 2001 as U.S. Pat. No. 6,289,847.

BACKGROUND OF THE INVENTION

1. Field of the Invention

This invention relates to the transfer and storage of solid animal waste, and replenishment of kitty litter, particularly as an attachment to a self-cleaning kitty litter box.

2. Background Art

With cats now becoming the most popular type of domestic pet, the use of kitty litter boxes continues to increase proportionally. Kitty litter boxes are normally made of plastic or similar material so that the cat's urine will not leak through the box. The box has placed in it one of any number of particulate kitty litter material meant to absorb moisture and odor from the cat's waste, as well as provide clumping agents so that the cat's liquid waste may solidify. These particulate materials are generally referred to as kitty litter. Cats also tend to bury their solid waste in the kitty litter.

General practice for most cat owners is to discard the kitty litter after an extended period of time. However, before the kitty litter has reached a state where it needs to be totally dumped, it is often necessary to periodically remove the cat's solid waste in order to prevent it from being kicked out of the litter box by the cat upon subsequent visits to the litter box, so that the cat or other animals do not step on the solid waste, thereby transferring it to other areas and causing a potential mess.

Many cat owners find the task of manually searching the kitty litter for solid waste to be obnoxious and burdensome. Thus, inventors have sought to devise ways of cleaning the solid waste automatically from kitty litter boxes. Patents showing devices for cleaning litter boxes include U.S. Pat. Nos. 4,096,827; 4,180,804; 4,190,525; 4,325,325; and 4,325,822. More recently, the inventor's licensee has commercialized a self-cleaning litter box, covered by U.S. Pat. No. 5,048,465 and issued to the inventor of the present invention, and U.S. Pat. No. 5,477,812, which discloses a self-cleaning litter box. While such litter box is self-cleaning, the solid waste holder, when full, must be slid out of the housing so that the solid waste may be dumped.

When a cat owner is away for a significant period of time or is otherwise unable to dump the tray, the cat's solid waste may collect and overflow the tray, which is unsightly and potentially messy due to the cats kicking it from box, etc. In other embodiments of the self-cleaning cat tray, a sensor provided in cooperation with the lid may cause the unit to cease operating when the tray becomes filled to a predetermined limit, such as when the lid is oriented away from its rest position.

Also, since in many self-cleaning options, kitty litter is dumped into the tray with waste, over a period of time, the amount of kitty litter for use by the cat is reduced.

Accordingly, there is a need for a device which is capable of accommodating a cat owner's absence or inability to dump solid waste from kitty litter boxes at intervals required by typical litter boxes. Further, there is a need for a device which cooperates with the dumping of solid waste from the kitty litter boxes to automatically replenish the supply of kitty litter in the box. Such device should also be compatible with current self-cleaning kitty litter box designs, should be easy to operate, easy to clean, easy to assemble, and easy and inexpensive to manufacture.

SUMMARY OF THE INVENTION

It is an object according to the present invention to provide a device adaptable to a kitty litter box for transferring waste from the kitty litter box while providing for the replenishing of kitty litter within the box.

It is another object according to the present invention to provide a device compatible with current self-cleaning kitty litter boxes for receiving and transferring waste therefrom and replenishing the kitty litter therein.

It is still another object according to the present invention to provide a self-cleaning kitty litter box which is adapted to remove the waste from the main kitty litter tray, receive the waste, and transfer the waste to a storage apparatus while replenishing the kitty litter.

It is yet another object according to the present invention to provide a device for transferring waste from and replenishing kitty litter into a litter box which is simple to operate, clean and assemble.

It is still a further object according to the present invention to provide a device for transferring waste from a kitty litter box and storing such waste under circumstances under which the cat owner is unavailable or unable to clean or remove the wasted from kitty litter at suggested or predetermined intervals while replenishing the kitty litter in the box.

In carrying out the above object and other objects of the present invention, a kitty litter replenishment device for use with a self cleaning kitty litter box that has a rake that periodically cycles through the kitty litter in the box to move waste and associated kitty litter to a waste collection area is provided, It includes a storage area for kitty litter to replenish kitty litter in the box, and a release mechanism for controlling when predetermined amounts of kitty litter in the storage area is released into the box. The predetermined amount of kitty litter is released with each cycle of the rake a device for transporting solid animal waste is provided.

In another embodiment of the invention, a long-term kitty litter maintenance device for a self cleaning kitty litter box that has a rake that periodically cycles through the kitty litter in the box to move waste and associated kitty litter to a waste collection area is provided. It includes a waste storage device and a kitty litter replacement device that work together to allow a kitty litter box that can be used for long periods without little maintenance. It includes a collection member orientable between a first position and a second position. In the first position, the collection member receives the waste. It also has a drive mechanism mounted to the collection member for moving the collection member between the first position and the second position. A large capacity storage member is included for receiving the waste from the collection member and storing the waste. In the first position, the collection member serves as the waste collection area for waste from the kitty litter box and in the second position, the collection member is disposed adjacent the storage member and transfers the waste to the storage member through its opening for storage. Also included is a storage area for kitty litter to replenish kitty litter in the box, and a release mechanism for controlling when predetermined amounts of kitty litter in the storage area is released into the box. The predetermined amount of kitty litter being released with each cycle of the rake.

In a further embodiment of the invention, a kitty litter replenishment device for use with a self cleaning kitty litter box that has a rake that periodically cycles through the kitty litter in the box to move waste and associated kitty litter to a waste collection area is provided which includes a storage area for kitty litter to replenish kitty litter in the box positioned above the box and a release mechanism for controlling when predetermined but adjustable amounts of kitty litter in the storage area is released into the box. The predetermined amount of kitty litter is released with each cycle of the rake. The release mechanism releases the predetermined amount of kitty litter in response to abutment of a portion of the release mechanism by the rake in the course of movement during its cycle.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 13 is a perspective view of the elements of the replenishing portion of the third embodiment of the device;

FIG. 14 is a cross-sectional view of the kitty litter release mechanism of the third embodiment when the release member can receive kitty litter; and FIG. 15 is a cross-sectional view of the kitty litter release mechanism of the third embodiment where the kitty litter can leave the release member.

DETAILED DESCRIPTION OF THE PREFERRED EMBODIMENTS

Figure 1:
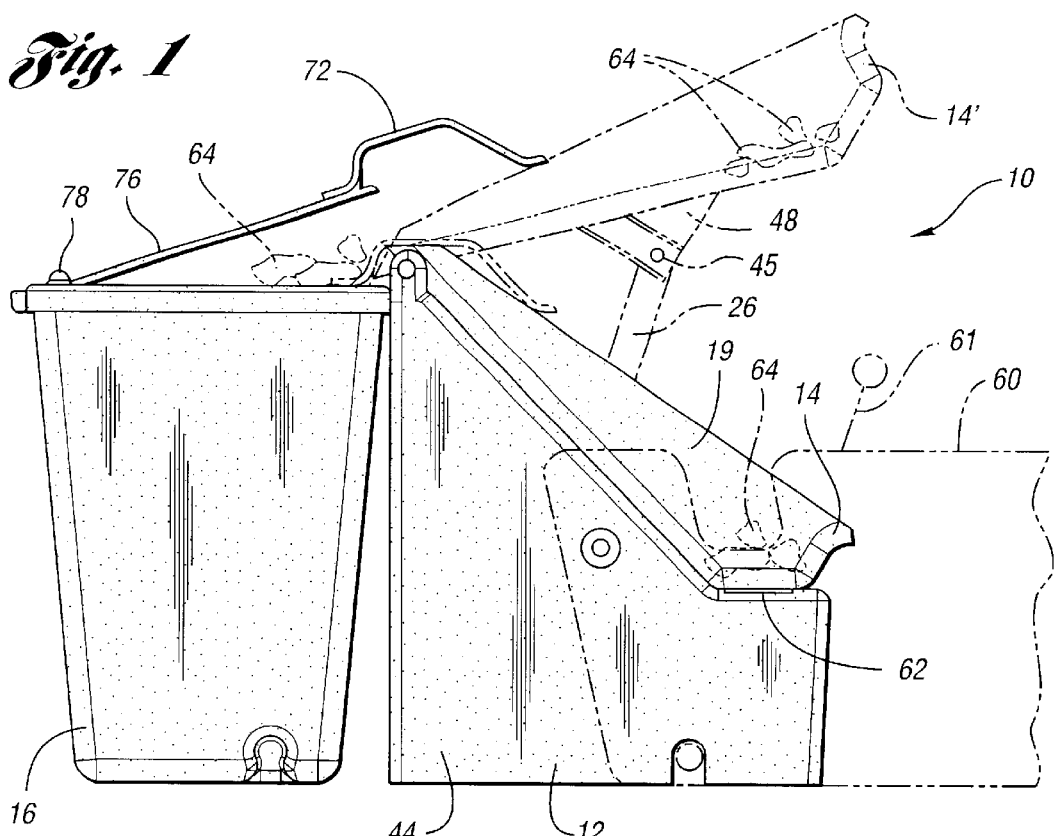
FIG. 1 is a side elevational view of the device according to the present invention, illustrating both the rest position and the dumping position.

With reference to FIGS. 1–4, shown therein is a first embodiment of a waste disposal assembly device 10 according to the present invention for transporting waste to a storage container. Assembly 10 is particularly suited for transporting waste from a kitty litter box 60. More particularly, assembly 10 is adapted for use in association with a self-cleaning kitty litter box 60, including but not limited to the device disclosed in U.S. Pat. No. 5,048,465 and U.S. Pat. No. 5,477,812, which are hereby incorporated by reference. Kitty litter box 60 also includes the product LitterMaid™ manufactured by the Windmere Corporation of Miami Lakes, Fla., now Applica Incorporated, under U.S. Pat. No. 5,048,465. Kitty litter box 60 is generally shown in FIG. 1 in phantom. Such examples of litter box 60 apply equally to litter box 100 disclosed further herein.

Note that while various embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

Figure 2:
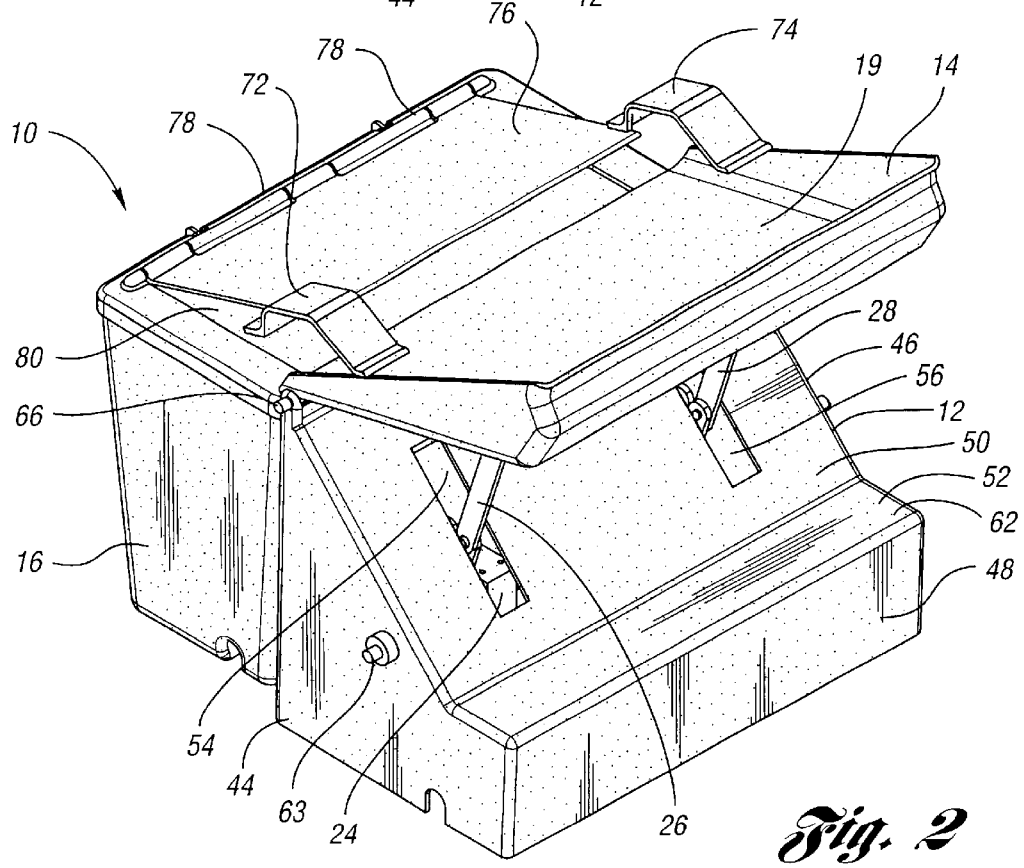
FIG. 2 is a perspective view of the device according to the present invention, illustrating the collection member in the dumping position.
Figure 3:
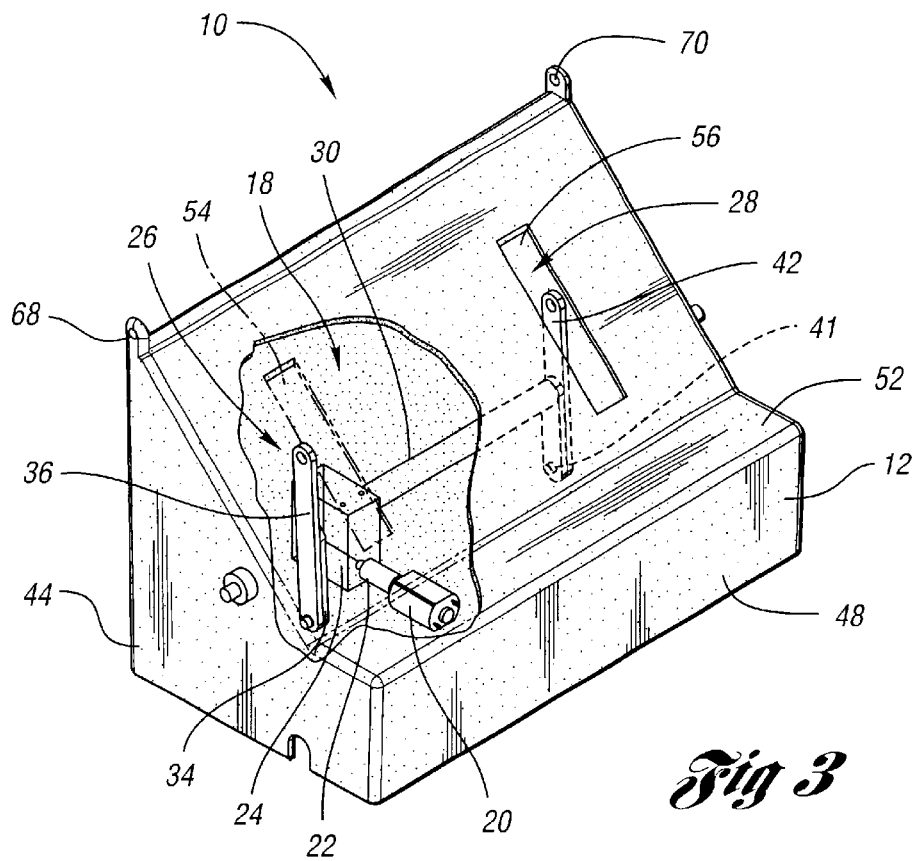
FIG. 3 is a perspective view of the device according to the present invention, showing the drive mechanism disposed in the housing in the first rest position and without the collection member and the disposal member.
Figure 4:
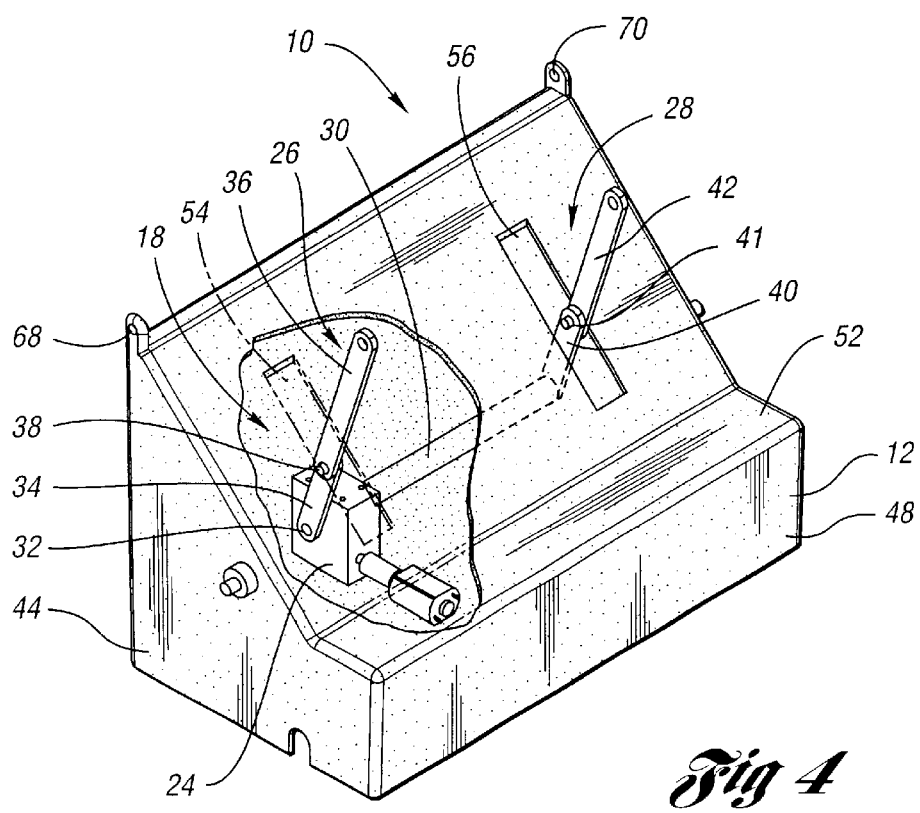
FIG. 4 is a perspective view of the drive mechanism of the device according to the present invention, showing the drive mechanism disposed in the housing in the second dumping position and without the collection member and the disposal member.

Referring to FIGS. 1 and 2, assembly 10 includes a housing 12, a collection member 14, and a disposal (or storage) member 16. Disposal member 16 may include a disposable inner liner, not shown, to allow repeated use of disposal member 16. With reference to FIGS. 2–4 (and as best shown in FIGS. 3–4), assembly 10 also includes a drive mechanism 18 which is mounted to collection member 14 and is operable to remove, lift, or otherwise transport the waste 64 which is collected in area 19 of collection member 14. Drive mechanism 18 is best illustrated in FIG. 3 and FIG. 4. As shown therein, drive mechanism 18 includes a motor 20, and a drive shaft 22 affixed to motor 20 at one end. The other end of drive shaft 22 is received by a gearbox 24. Gearbox 24 is operable to manipulate and operate a pair of transport (lifting) members 26, 28 smoothly between a first (rest) position (shown in FIGS. 1 and 3) and second (dumping) position (as shown in phantom in FIG. 1 and also in FIG. 4), according to the present invention.

As further illustrated in FIG. 3, lifting member 26 is illustrated as being directly attached to gearbox 24, while lifting member 28 is spaced apart from gearbox 24 by a shaft 30, which is disposed between gearbox 24 and lifting member 28. Shaft 30 is engaged with gearbox 24 at one end and lifting member 28 at its other end. As best illustrated in FIG. 3, gear box 24 is fixedly disposed within housing 12. Lifting member 26 is mounted to gearbox 24 via a pin 32 which has an axis corresponding to the axis of shaft 30 and which allows lifting member 26 to pivot and move relative to gearbox 24. (See FIG. 4). Preferably, shaft 30 is coaxially aligned with pin 32 so that lifting members 26 and 28 are operable to move in a synchronized manner. Each lifting member 26 and 28 includes a first lifting portion and a second lifting portion. Lifting member 26 includes first lifting portion 34 and second lifting portion 36 which are pivotably mounted to each other via pin 38. Similarly, lifting member 28 includes first lifting portion 40 and second lifting portion 42 which are similarly pivotably mounted to each other at pin 41. With reference to FIG. 1, the free ends of lifting members 26, 28 are pivotably joined to depending supports 48 by pins 45. FIG. 3 illustrates drive mechanism 18 in a first, retracted (or rest) position. FIG. 4 shows drive mechanism 18 in a second, extended (or dumping) position.

While drive mechanism 18 includes those components shown in FIGS. 3–4 and described above, it is fully contemplated herein that drive mechanism 18 may include any number or variety of components which allow it to operate and manipulate assembly 10 in accordance with the present invention. Thus, in another embodiment, motor 20, drive shaft 30, and gearbox 24 may be centrally disposed between lifting members 26 and 28 such that a drive shaft similar to drive shaft 30 may extend laterally from gearbox 24 to its corresponding lifting members 26 and 28.

FIGS. 2–4 illustrate drive mechanism 18 disposed within housing 12. Note that housing 12 includes a pair of opposed side panels 44, 46, a front panel 48 vertically oriented, a front angled panel 50, and a front horizontal panel 52. Angled front panel 50 has a pair of openings 54, 56, through which may extend lifting members 26, 28, respectively and more particularly, upper portion 36, 42 of each lifting member 26, 28, respectively, when drive mechanism 18 is operable and is in a dumping position (shown in FIGS. 2, 4 and in phantom as shown by container 14' in FIG. 1).

In keeping with the teachings according to the present invention, assembly 10 is operable to transport or remove waste 64, preferably from a kitty litter box 60. As shown in FIG. 1, housing 12 includes a pressure transducer or load sensor 62 for measuring or detecting pressure or load. Particularly, transducer 62 is disposed between collection member 14 and housing 12 and is cooperable with drive mechanism 18. However, switch mechanism 62 may be disposed in any acceptable location which allows it to sufficiently measure the pressure or load of waste 64 in collection member 14 in order to actuate motor 20 for operating drive mechanism 18 according to the present invention responsive to the amount of collected waste. Switching member 62 is in communication with motor 20, thereby actuating motor 20 and operating drive mechanism 18 as described heretofore in association with FIGS. 3 and 4.

Accordingly, collection member 14 is oriented to receive waste 64 therein. Waste 64 may be received by collection member 14 under any number of circumstances, including but not limited to device 10 being position adjacent self-cleaning kitty litter box 60 such that the waste 64 removed during the cleaning cycle of self-cleaning kitty litter box 60 is transported or otherwise disposed within collection member 14. Housing 12 may include an opening 81 transversely disposed along its bottom portion for allowing it to fit or mate with self-cleaning kitty litter box 60.

When switch mechanism 62 (or sensor) detects a threshold predetermined amount of pressure or load in collection member 14, it actuates the electrical sequence and motor 20. Alternatively, device 10 may be operated at predetermined intervals, such as being responsive to the number of cycles of the self-cleaning litter box 60 or the passage of time. Its operation may also be triggered by a switch mechanism responsive to the movement of rake 61 of litter box 60 as it proceeds through its cleaning cycle. Of course, it is fully contemplated that the switch or sensor may be triggered by any number of variables, such as sound, motion, etc. Each embodiment disclosed and contemplated herein may include an operator-activated switch, shown as a button 63, may be included to allow manual operation as desired by the pet owner or other user.

When collection member 14 is in contact with housing 12 as shown in FIG. 1, drive mechanism 18 is positioned as illustrated in FIG. 3 in a first rest position. Collection member 14 is also affixed to housing 12 and pivotably moves relative to housing 12. Particularly, collection member 14 is preferably mounted to housing 12 via pivot pin members 66 (FIG. 2) which are mounted to collection member 14 and are inserted through holes 68, 70 formed in housing side walls 44 and 46, respectively.

With further reference to FIGS. 1 and 2, assembly 10 further includes a pair of brackets 72 and 74 mounted at one end to collection member 14. The other end of brackets 72, 74 are attached to a lid 76 for storage compartment (disposal member) 16. Lid 76 is pivotably attached to storage member 16 via hinge portions 78. When drive mechanism 18 is in the first rest position, lid 76 is oriented so that it covers the upper opening 80 of storage compartment 16. As shown in FIGS. 1 and 2, in the dumping position, the raised angle of collection member 14 causes brackets 72, 74 to be raised at an angle, thereby correspondingly raising lid 76 from opening 80, such that any waste 64 disposed in collection member 14 slides or rolls off collection member 14 and into storage container 16 for disposal. Note that the rear portion of collection member 14 is oriented adjacent to opening 80 of container member 16 when in the second dumping position.

In operation, activation of the motor 20 will cause rotation in gearbox 24, in turn causing each first lifting portion 34, 40 of drive mechanism 18 to rotate about the axis of shaft 30 starting from the first (rest) position. Pins 38, 41 move in a path defined by a circle about the shaft axis. Both the shaft axis and pivot pins 66 of collection number 14 are fixed with respect to housing 12. Thus, as pins 38, 41 move in a circular path about the shaft axis, second lifting portions 36, 42 are constrained by pins 45 to move drive mechanism 18 from the first (or rest) position shown in FIG. 3 to the second (or dumping) position shown in FIG. 4. This causes collection member 14 to be moved from its lowered filling (rest) position shown in FIG. 1 to the second (dumping) position also shown in FIG. 1 by collection member 14'. to complete its cycle, pins 38, 41 continue about the circle until first lifting portions 34, 40 return to the first (rest) position, such that collection member 14 is lowered to the filling position. Motor 20 then stops. It is also contemplated that disposal member 16 (and 116 herein) may include a vacuum or other means of drawing waste 64 therein.

Figure 5:
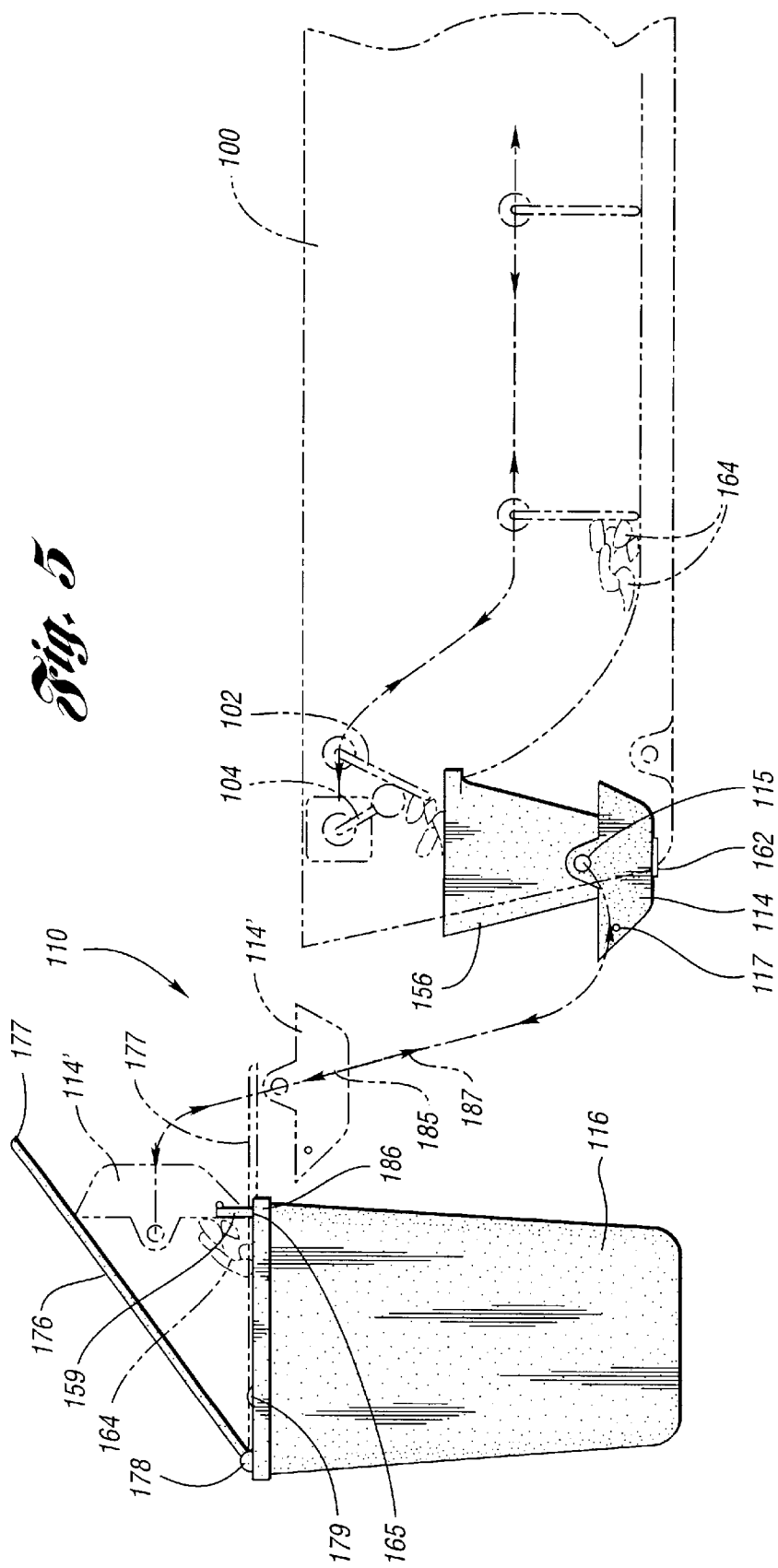
FIG. 5 a schematic illustration of the side elevational view of the second embodiment of the device showing the collection member in various positions, and also showing the device in association with a self-cleaning kitty litter box.
Figure 6:
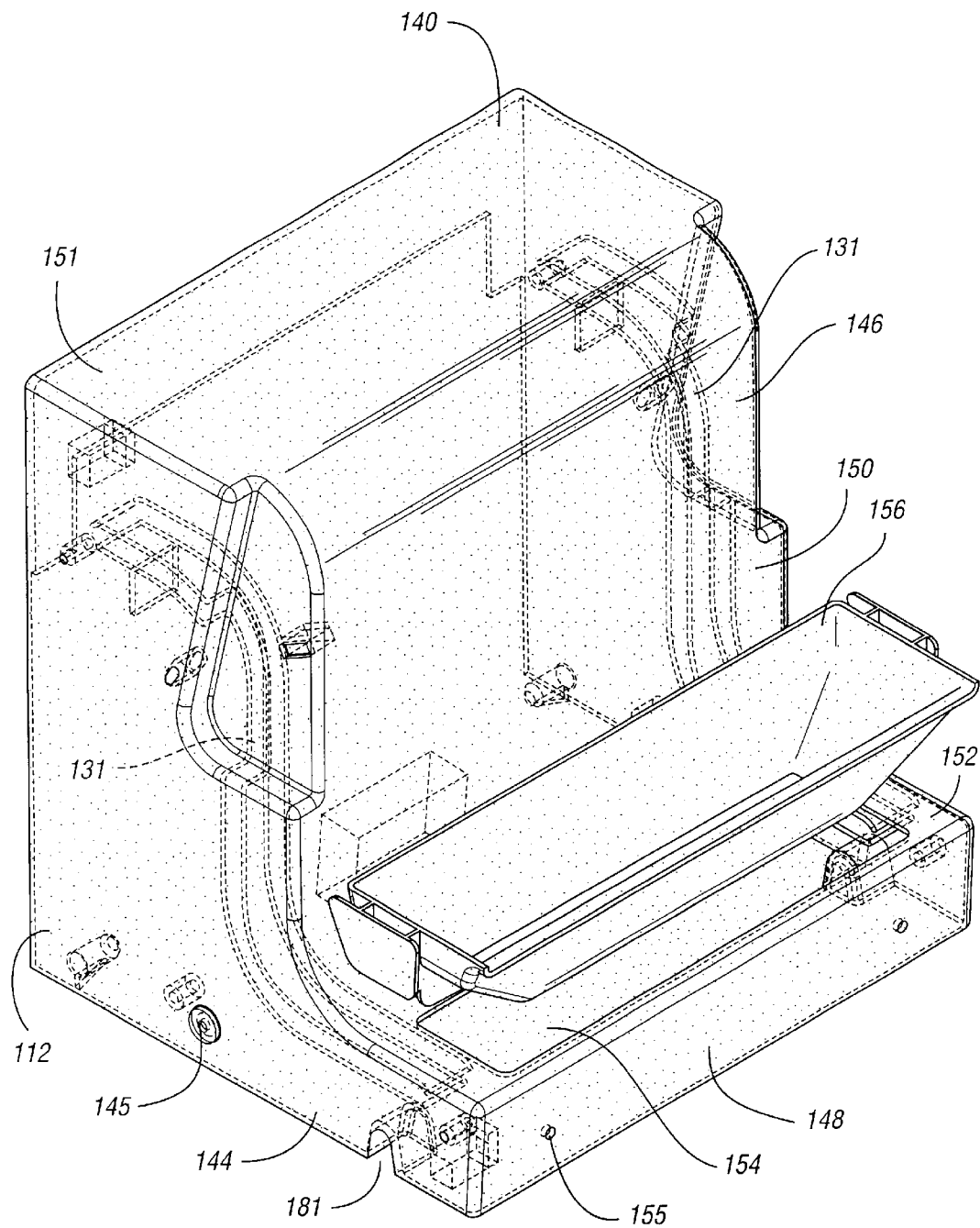
FIG. 6 is a perspective view of the housing of the second embodiment of the device according to the present invention, in association with the funnel member.

FIGS. 5–10 illustrate generally a second embodiment of the device according to the present invention, designated as assembly device 110. In order to illustrate the operation of device 110, FIGS. 5–6 illustrate device 110 without a housing or drive mechanism. As shown in FIG. 5, device 110 may operate in association with a self-cleaning kitty litter box 100. Device 110 includes a housing 112 (shown in FIGS. 7 and 8), a collection member 114 (shown in FIGS. 5 and 8), a storage member 116 (shown in FIGS. 5, 7 and 9), and a drive mechanism 118 (shown in FIGS. 7 and 8). Storage member may include a disposable inner liner, not shown, to allow repeated use of storage member 116.

Figure 7:
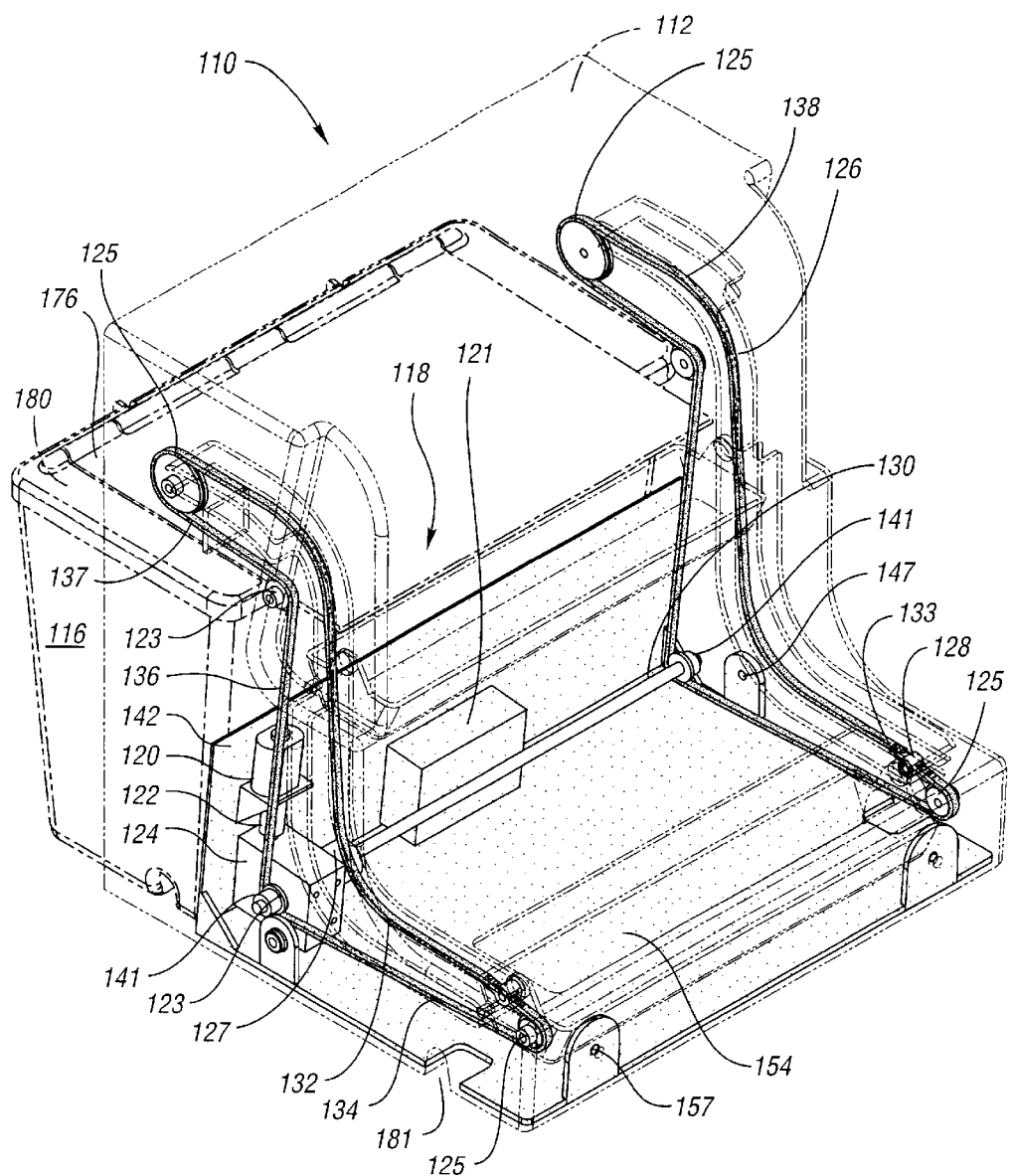
FIG. 7 is another perspective view of the device according to the second embodiment showing the drive mechanism, and further showing the upper housing portion in phantom.

With reference to FIG. 7, drive mechanism 118 is illustrated in detail. Drive mechanism 118 includes a motor 120, a control box 121, drive member or chain 126, and a plurality of drive and idler tooth sprockets 123, 125, respectively. Drive mechanism 118 also includes a gearbox 124 which preferably includes a reduction mechanism. Further, drive mechanism 118 has a shaft coupling 127 and a motor coupling 122. Drive mechanism 118 further includes a drive shaft 130 and driving bushings 141. Each is joined to drive sprockets 123 and drive chain 126.

As best illustrated in FIG. 7, drive mechanism 118 is preferably disposed within housing 112 and substantially enclosed by housing 112. While drive mechanism 118 includes those components shown in FIG. 7 and described above, it is fully contemplated herein that drive mechanism 118 may include any number or variety of components which allow it to operate and manipulate assembly 110 in accordance with the present invention. Thus, in another embodiment, motor 120, drive shaft 130, and gearbox 124 may be centrally disposed between the pair of drive chains 126 such that a pair of drive shafts similar to drive shaft 130 may extend laterally from gearbox 124 to its corresponding sprocket 125, or a single drive shaft passing through the gear box may be used.

Figure 8:
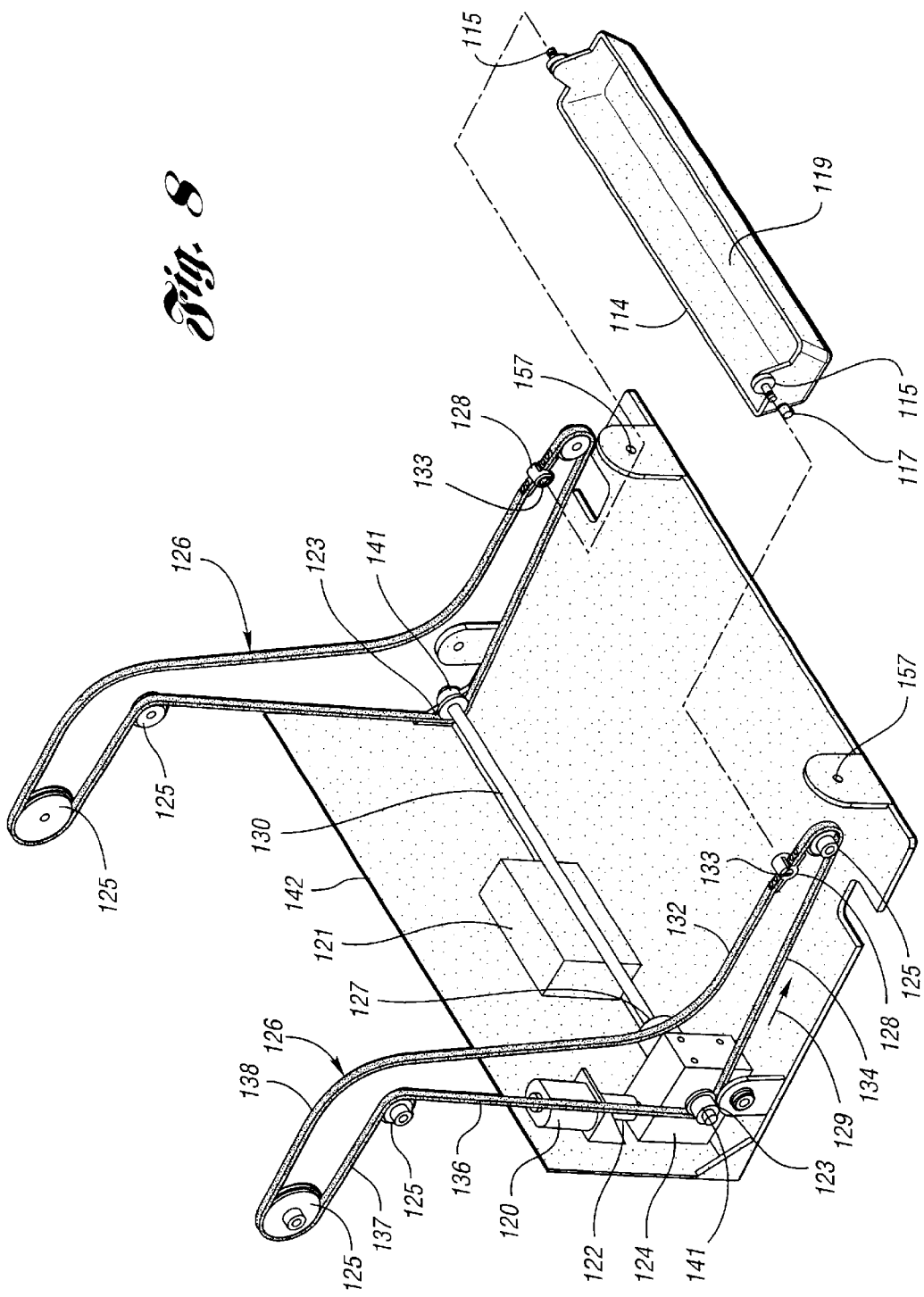
FIG. 8 is a perspective view of the drive mechanism of the second embodiment with a partial lower portion of the housing, and further showing the assembly of the collection member thereto.

As illustrated in FIGS. 7 and 8, collection member 114 is mounted to drive mechanism 118. Particularly, collection member 114 is mounted to each bushing 128. More particularly, pins 115 of collection member 114 are received within openings 133 of bushings 128. A tipping pin 117 is disposed on at least one side of collection member 114, for the purposes described herein.

As illustrated, drive member 126 includes an arcuate portion 132 and linear portions 134, 136, 137, and 138. Of course, drive track 126 may have any shape or configuration allowing it to operate according to the teachings of the present invention. Housing 112 includes an upper housing portion 140 as shown in FIG. 6 and a lower housing portion 142 as shown in FIG. 7. Particularly, upper housing portion 140 and lower housing portion 142 are preferably removably attached to each other so that drive mechanism 118 may be accessed for service and maintenance purposes. Upper housing portion 140 and lower housing portion 142 are attached together by way of typical mechanical fastening means such as a nut and bolt combination received through holes 155 and upper housing portion 140 and holes 157 in lower housing portion 142,, holes 155 and 157 being axially aligned with each other, when device 110 is assembled. Likewise with holes 145 of upper housing portion 140 and holes 147 of lower housing portion 142.

With further attention to FIG. 6, upper housing portion 140 includes a pair of side panels 144 and 146, a front vertical panel portion 148, a front angled panel 150, a first front horizontal panel 151, and a second front horizontal panel 152. Front angled panel 150 extends between horizontal panels 151 and 152. Second front horizontal panel 152 includes an opening 154 for receiving a funnel member 156, as shown particularly in FIGS. 5 and 6. Collection member 114 is disposed below opening 154 and funnel member 156, and is otherwise covered by housing 112. Housing 112 may include an opening 181 transversely disposed along its bottom portion for allowing it to fit or mate with self-cleaning kitty litter box 100.

With reference to the schematic side view illustration of FIG. 5, in operation, as rake 102 of cat box 100 moves through its operating (cleaning) cycle, rake 102 activates a limit switch 104 near the end of its cycle deposits waste 164 into tapered funnel 156 which falls through housing opening 154 into collection member 114. In a preferred embodiment, the actuation of limit switch 104 causes a timer to begin counting to a predetermined length of time prior to energizing motor 120. Alternatively, as with the first embodiment of device 10, a switch or transducer 162 in communication and cooperation with drive mechanism 118 may detect a predetermined load threshold actuating a switch in control box 121, thereby actuating the electrical sequence for energizing motor 120. Of course, in either embodiment, a predetermined delay may exist between the time the electrical sequence is triggered and the time the motor operates. A manual switch may also be provided to energize the motor.

In an embodiment where the electrical system of device 10, 110 is independent of the kitty litter box 60, 100, when the load sensor 62 is triggered, it may preferably begin a predetermined delay period, thereby allowing the rake 61, 102 of litter box 60, 100 to return to its home or rest position in the litter box. Upon the rake's return to its home position, motor 20, 120 of device 10, 110 is energized, causing drive mechanism 18, 118 to move between the first position to the second position, and back to the first position, completing the cycle. As disclosed herein, cycling may be conditioned on lid 76, 176 being in a down or closed position upon storage container 16, 116.

Figure 9:
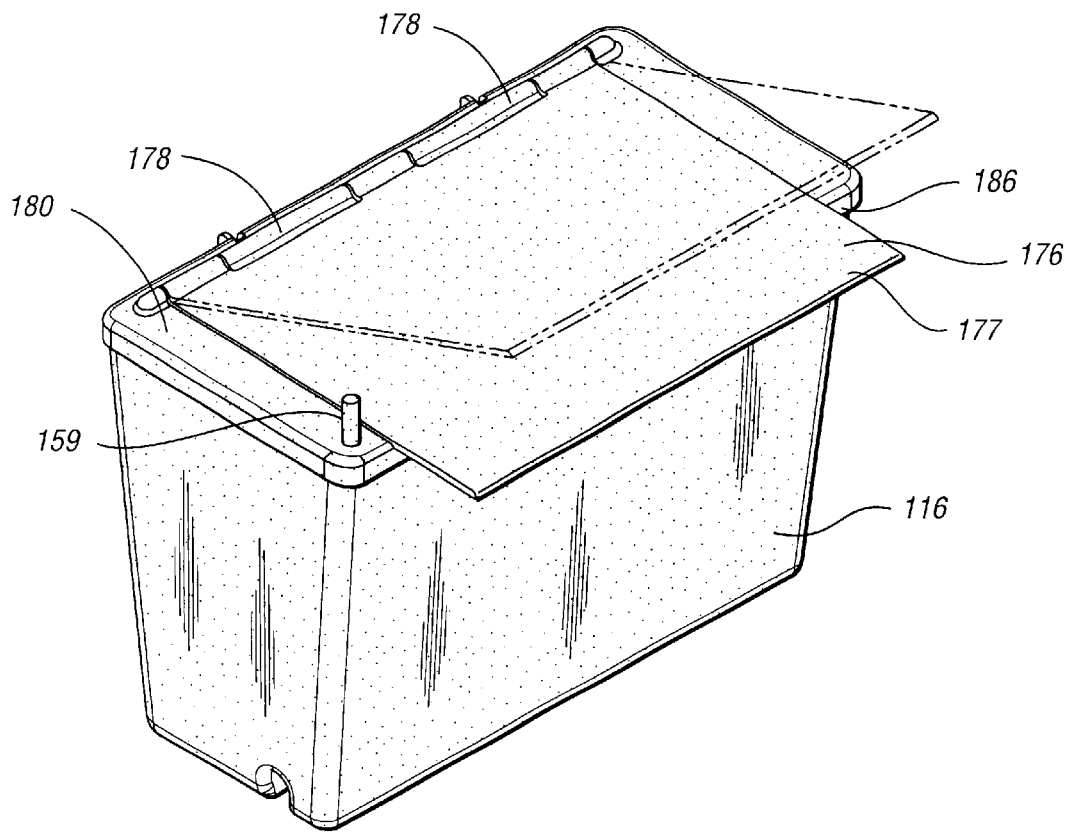
FIG. 9 is a perspective view of the disposal member of the second embodiment.

Upon being energized, motor 120 rotates motor shaft 122 which in turn causes gearbox 124 to provide movement to drive shaft 130, thereby turning sprockets 123. Sprocket 123 rotates thereby providing movement to drive chain 126, causing drive chain 126 to move along its predetermined designated path as defined by track 131 in housing 112 (as shown in FIG. 6), which corresponds to the path of drive chain 126, in the direction designated by arrow 129 in FIG. 8. Such movement causes driver bushings 128 (which are attached to drive chain 126) and accordingly, collection member 114 (mounted to driver bushing 128) to move in an upwards direction (again, in the direction designated by arrow 129) thereby providing its assent towards the opening 180 of storage/disposal member 116 (as shown schematically by upward oriented arrows 185 in FIG. 5, and also in FIG. 8). Storage member 116 is best shown in FIGS. 5, 7 and 9.

When driver bushing 128 reaches a designated position on drive chain 126, tipping pin 117 contacts an abutment member 159 (or tilt member) mounted to storage container 116, as shown in FIG. 5. Upon contact and interference with abutment member 159, tipping pin 117 is unable to continue its predetermined path and thus pivots collection member 114 relative to drive bushings 128 (on pins 115) such that the opening 119 of collection member 114 is oriented adjacent to storage member 116, thereby dumping the contents of collection member 114 into storage member 116. Such movement is illustrated schematically in FIG. 5. Abutment member may also be disposed on housing 112 or any other location which serves to place collection member 114 in the proper orientation for transferring waste to storage container 116.

Storage member 116 may have a lid 176 for providing a cover to opening 180 of storage member 116. Lid 176 pivots on hinges 178 to storage member 116. The forward edge 177 of lid 176 extends beyond front edge 186 of container 116. Lid 176 is lifted upward and moves away from opening 180 at the appropriate part of the waste transfer cycle due to abutment of the collection member 114' (see FIG. 5) with forward edge 177 of lid 176 such that the contents of collection member 114 may be transferred directly into storage member 116 as shown in FIGS. 5 and 7, as collection member 114' is rotated and halted by abutment 159.

Storage container 116 may also include a switch or a sensor 179 which detects when it is overfilled with waste 164 and halts the operation of device 110, and/or provides a signal, audible, visual, or otherwise, to the pet owner. Specifically, switch 179 may be operable such that if it is not triggered (i.e., when lid 176 does not sit flush on opening 180 of storage container 116) after a predetermined amount of time, a signal is provided to motor 120 not to activate drive mechanism 118 until the storage container 116 is emptied or replaced. In the alternative, switch 179 may act as a confirmation that the unit is in an operable state, such that it may only allow the unit to operate if lid 76, 176 is sitting flush on its corresponding storage container 16, 116.

As collection member 114 dumps its contents into storage member 116, collection member 114, simultaneously or a short time thereafter, contacts a second limit switch 165, which may be in association with abutment member 159, and which causes the motor to reverse, thereby causing drive chain 126 to move in a direction opposite arrow 129 of FIG. 8 or (by downwardly directed arrows 187 of FIG. 5), thus returning collection member 114 to its first position adjacent cat box 100 and disposed below funnel member 156.

It is noted that devices 10 and 110 according to the present invention may be electrically connected with self-cleaning kitty litter box 100 in order to utilize the power source of the litter box 100. In such a case, devices 10 and 110 are adapted to plug into an receiving member on litter box 100 for operation by the control and drive mechanisms and processor of litter box 100. In the alternative, devices 10 and 110 may run off their own power sources, and therefore has separate control boxes for controlling the switching mechanisms and processing of the devices 10 and 110, independently of kitty litter box 100.

Waste transfer device 10, 110 may be in electrical communication or otherwise connected to kitty litter box 60, 100 by a cord or other suitable connector (not shown.) This allows the electrical system of waste transfer device 10 to act in association with the electrical system of kitty litter box 60, 100. Thus, the waste device transfer system may then be trigger or alerted to operation by the movement of, for example and not limitation, the movement of rake 61, 102 of the kitty litter box (such as when the rake returns to its home or rest position in the kitty litter box.)

Figure 10:
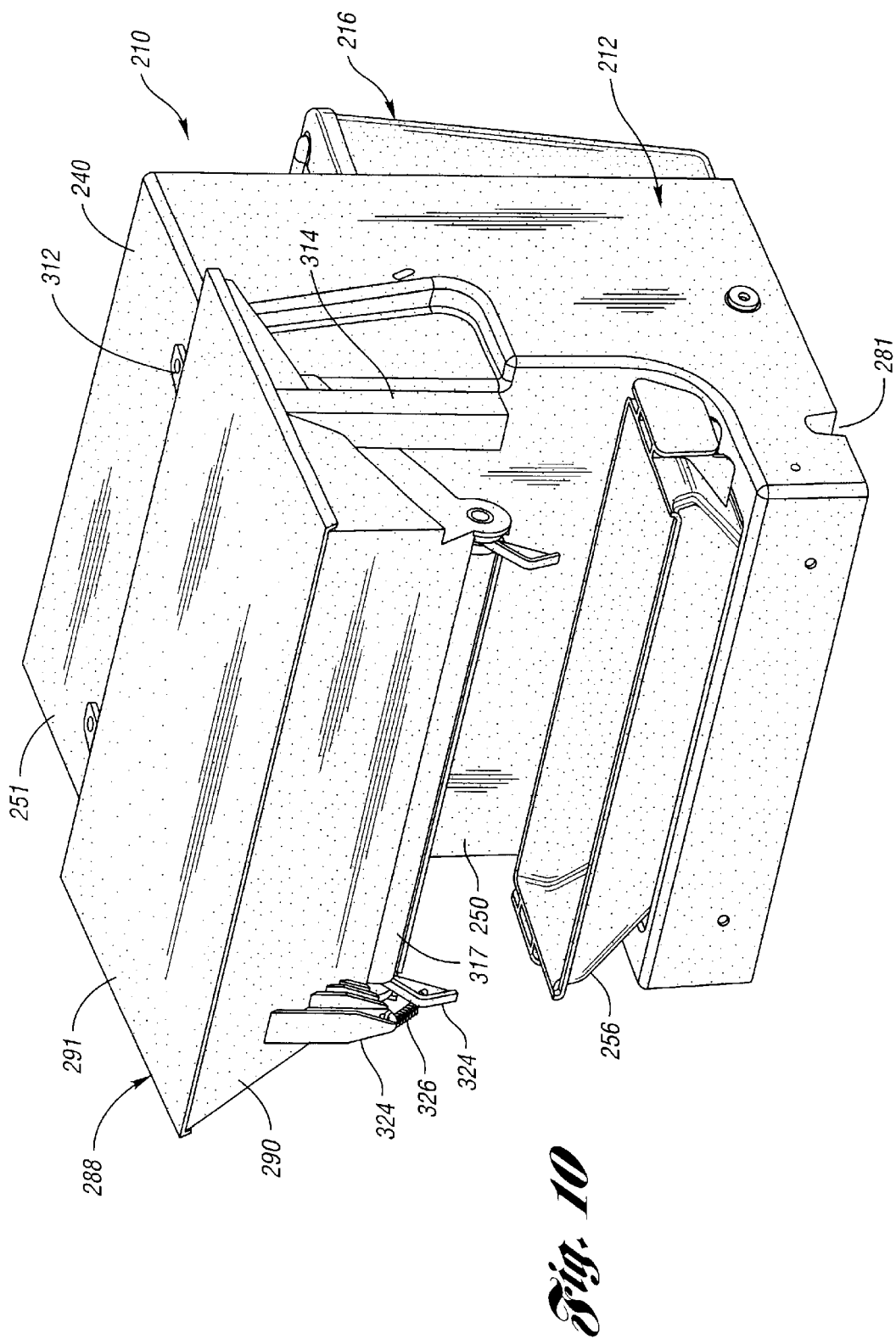
FIG. 10 is a perspective view of the housing of a third embodiment device according to the present invention, in association with the funnel member.
Figure 11:
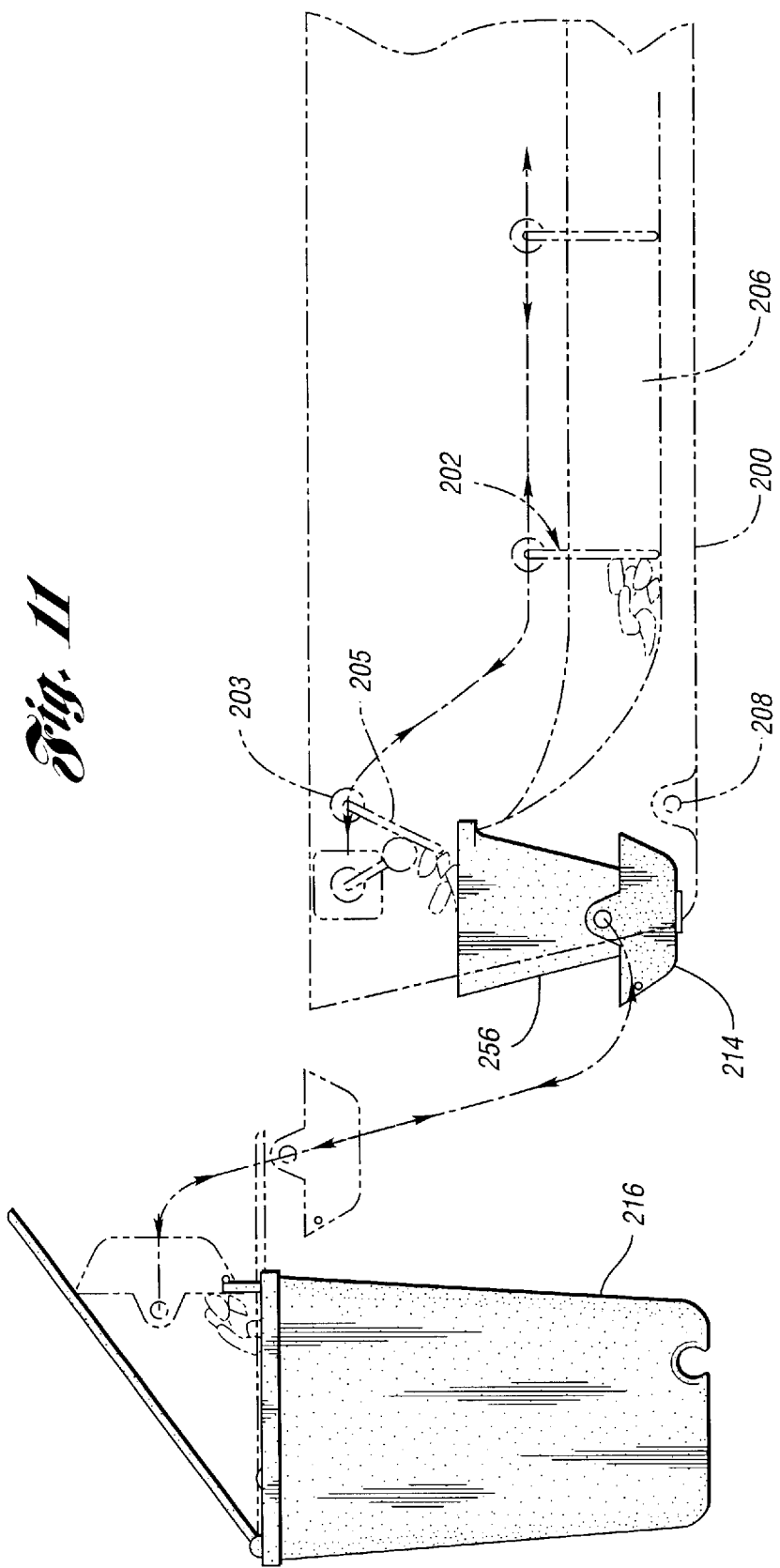
FIG. 11 is a schematic illustration of the side elevation view of the third embodiment of the device showing the collection member in various positions and also showing the device in association with a self-cleaning kitty litter box.
Figure 12:
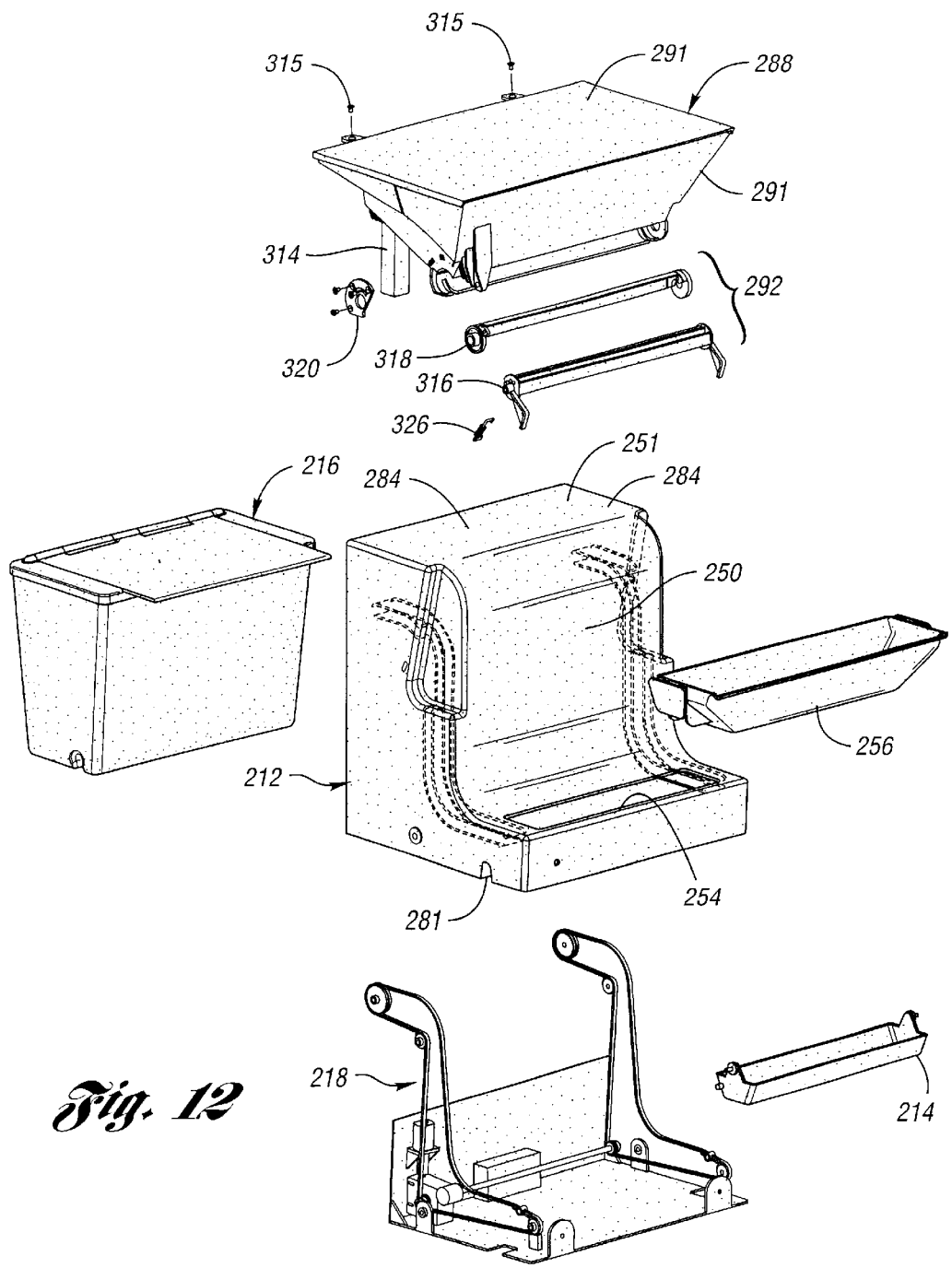
FIG. 12 is an exploded perspective view of the third embodiment of the device according to the present invention.

FIGS. 11–13 illustrate generally a third embodiment of the device according to the present invention designated as assembly device 210. This embodiment corresponds to the second embodiment with the addition of a replenishing portion 288 to allow kitty litter 206 within the associated kitty litter box 200 to be periodically replenished. The storage portions of the third embodiment correspond to the elements and operation of the second embodiment as shown in FIGS. 10 and 11, except that provision is made to support the replenishing portion of the device.

Thus, as best shown in FIG. 12, the third embodiment includes the collection housing 212 for drive mechanism 218. The drive mechanism moves collection member 214 in a manner corresponding to that of the second embodiment. The housing also has an opening 254 for receiving funnel member 256, as shown in FIG. 10. The housing also has an opening 281 to allow mating with kitty litter box 200 on positioning pin 208.

The back of the housing 212 is open so to allow placement of storage member 216 partially within the housing.

Upper housing portion 240 has a horizontal panel 251 with two screw holes 284 which are used to position and support the replenishing portion 288. The housing also has a front panel 250 extending downwardly from the horizontal panel 251.

The replenishing portion 288 has a housing 290, top 291 and various additional members of a kitty litter release mechanism 292.

As shown in FIG. 13, the housing has a steeply sloped front panel 294, a more gently sloped rear panel 292 and a pair of inclined side panels 298, 300 to create a storage area 302 for kitty litter that is to be used to replenish the kitty litter in kitty litter box 200. The panels are inclined so to direct the kitty litter to an opening 304 in the bottom of the storage area. Along the rear portion of opening 304 is a downwardly extending arcuate portion 306. At one end of the opening, the housing includes pivot ring 308.

Top 291 is provided for placement over storage area 302 so to enclose it.

Connected to the rear panel 296 are a pair of brackets 312 and a pair of downwardly extending columns 314. When brackets 312 are aligned with the holes 284 of the collection housing, screws 315 can be used to join replenishing portion of housing 290 to collection housing 212. Columns 314 are designed to align with the front panel 251 of the collection housing and bear most of the weight of the replenishing portion 288.

The replenishing portion also includes a release mechanism positioned in housing opening 304. It includes a pivotable kitty litter release member 316 and metering guard 318. A second pivot ring 320 is joined to the housing by screws 322. The metering guard and release mechanism are pivotally held between the two pivot rings.

Release member 316 have a pair of outer ends 336. On the outer face of each of the outer ends is a pivot member 337 which fits within corresponding holes on the inner face of end caps 332 of the metering guard 318. On the outside of each of the end caps 332, there are pivot pins 333 designed to pivotably be held within pivot rings 302 and 320. On the inner surface of each end cap is a nub 330 which is designed to fit within one of three indentations 334 on the outer surface of release member ends 336.

As part of release member 316, there are four parallel walls 317 extending between the outer ends of the release member so to define a plurality of litter receiving areas in the form of three elongated columns 319 passing through the release member.

The release member 316 includes abutment 324 whose purpose will be explained later. A return spring 326 extends from one of the abutment members 324 to a spring retaining portion 328 of the housing.

Operation of the third embodiment is described in relation to a kitty litter box where kitty litter 206 is placed within a kitty litter box 100 that provides for automatic cleaning of waste from the kitty litter. Clumping kitty litter is recommended. This type of kitty litter will clump together as the cat urinates so to allow cat waste in the form of urine to be also removed automatically.

Periodically, as described in U.S. Pat. Nos. 5,048,465 and 5,477,812, the disclosures of which are incorporated herein, a rake 202 is cycled through the kitty litter. The rake has a shaft 203 extending substantially across the kitty litter box. Extending downwardly from the shaft are a plurality of tines 205, which move through the kitty litter collecting waste. The tines are moved up along the bottom of the kitty litter box until they dump collected waste into funnel 256 in a manner described with regard to second embodiment. In the same manner as the second embodiment, the waste is then transported to storage member 216. Because some kitty litter will be lost from the kitty litter box and transported to the storage device 216 as a natural course of the cleaning process, over time the kitty litter in the box will be reduced. In the third embodiment, new kitty litter is periodically introduced into the kitty litter box during the process in which the kitty litter box is cleaned.

Specifically, in the embodiment shown, as shaft 213 of the rake moves along its cleaning process, it will, towards the end of the cycle, hit abutment 324 of the release member 316 while the release member is in a first at-rest position as dictated by spring 326, as shown in FIG. 14. In this position, the upper portion of channels 319 are open to the kitty litter storage area 302 and thus become filled with kitty litter, as shown in FIG. 14. Kitty litter is prevented from passing through the columns by the arcuate rear portion 306 of the housing 290. When rake shaft 203 contacts abutment 324 and continues forward, this acts to rotate the release member in a clockwise manner, as seen in FIGS. 14 and 15. When it reaches its final dumping portion, as shown in FIG. 15, shaft 203 will have rotated release member 316 to a kitty litter release portion shown in FIG. 15 and the kitty litter retained within the columns is then dumped into the kitty litter box behind the tines. When the movement of the rake is reversed, spring 324 will cause the release member to return to its original position and thus be reloaded with kitty litter.

As the rake continues rearward toward the back of the kitty litter box, the tines will help distribute the new kitty litter rearwardly in the box. Thus, in each cycle of the kitty litter box when waste is removed, new kitty litter will be deposited within the kitty litter box to help replenish the box's kitty litter.

Although the volume of kitty litter to be retained within the columns 319 is intended to replace the normal amount of kitty litter to be collected so to maintain the box in basic equilibrium in terms of kitty litter supply, it is recognized the amount may need to be adjusted. To allow adjustment by the owner of the box, metering guard 318 is provided. It is normally maintained in a set radial position with respect to the release member by the placement of nubs 330 within one of three indentations 334 on each of the outer ends 336 of the release member. When the nub is in the first of the three indentations, the metering guard will not cover any of the upper portions of the columns, as shown in FIG. 14. Thus, the kitty litter is free to enter into all three columns. However, if the second pivot ring 320 is loosened, finger tab 338 can be used to open the guard so that nubs 330 can be rotated into one of the other indentations 334. If moved to the center indentation, the guard will cover the upper portion of the first column 319 so that only two of the columns may be filled with kitty litter, thereby reducing the amount of kitty litter that will be dumped into the kitty litter box during each cycle. To further restrict the amount of kitty litter being dumped, the nubs may be moved to the third indentation so that the guard will cover two of the three columns.

It is fully contemplated that the teachings according to the present invention may be operable as an attachment to a kitty litter box, or in the alternative may be integrally incorporated into a self-cleaning kitty litter box forming a single unit. In the integrated unit, the teachings according to the present invention would preferably take the place of the waste container that presently exists. It is also contemplated that the features shown and disclosed relative to one embodiment may be equally applicable to other embodiments.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A kitty litter replenishment device for use with a self cleaning kitty litter box that has a supply of kitty litter in the box and a cleaning tool that periodically cycles through the kitty litter in the box to move waste and a portion, but not all, of the kitty litter in the box to a waste collection area, comprising a storage area for kitty litter to replenish kitty litter in the box; and a release mechanism for controlling when a predetermined amount of kitty litter in the storage area is released into the box, where the predetermined amount of kitty litter is released with in response to cycling of the cleaning tool.

2. The device of claim 1 wherein the cleaning tool is a rake.

3. The device of claim 1 wherein the predetermined amount of kitty litter is released during cycling of the cleaning tool.

4. The device of claim 1 wherein the predetermined amount of kitty litter is released with each cycle of the cleaning tool.

5. The device of claim 1 wherein the predetermined amount of kitty litter can be varied between release.

6. A long-term kitty litter maintenance device for a self cleaning kitty litter box that has a supply of kitty litter in the box and a cleaning tool that periodically cycles through the kitty litter in the box to move waste and a portion, but not all, of the kitty litter in the box to a waste collection area, comprising a collection member orientable between a first position and a second position, wherein in the first position, the collection member receives the waste therein;

a drive mechanism mounted to the collection member for moving the collection member between the first position and the second position; and a large capacity storage member for receiving the waste from the collection member and storing the waste therein, having an opening, wherein in the first position, the collection member serves as the waste collection area for waste from the kitty litter box and in the second position, the collection member is disposed adjacent the storage member and transfers the waste to the storage member through its opening for storage therein, a storage area for kitty litter to replenish kitty litter in the box; and a release mechanism for controlling when predetermined amounts of kitty litter in the storage area is released into the box, where the predetermined amount of kitty litter is released with each cycle of the cleaning tool.

7. The device of claim 6 wherein the release mechanism also includes a release member which in its first position allows the predetermined amount of kitty litter to move from the storage area into the release member and in a second position allows the predetermined amount of kitty litter to move from the release member into a kitty litter box and where the release member is moved from its first position to second position due to cycling of the cleaning tool.

8. A kitty litter replenishment device for use with a self cleaning kitty litter box that has a rake that periodically cycles through the kitty litter in the box to move waste and associated kitty litter to a waste collection area, comprising a storage area for kitty litter to replenish kitty litter in the box positioned above the box;

a release mechanism for controlling when predetermined but adjustable amounts of kitty litter in the storage area is released into the box, where the predetermined amount of kitty litter is released with each cycle of the rake; and the release mechanism releasing the predetermined amount of kitty litter in response to abutment of a portion of the release mechanism by the rake in the course of movement during its cycle.

9. The device of claim 8 wherein the release mechanism also includes a release member which in its first position allows the predetermined amount of kitty litter to move from the storage area into the release member and in a second position allows the predetermined amount of kitty litter to move from the release member into a kitty litter box and where the release member is moved from its first position to second position due to cycling of the rake.

10. The device of claim 9 wherein the release member has a plurality of litter receiving areas which may receive litter from the storage area in its first position and release litter into the kitty litter box in its second position, and wherein the release mechanism also has a release guard which can be selectively moved to prevent litter from being received within one or more of the litter receiving areas so to allow adjustment of the predetermined amount of kitty litter.

11. A kitty litter replenishment device for use with a self cleaning kitty litter box that has a cleaning tool that periodically cycles through the kitty litter in the box to move waste and associated kitty litter to a waste collection area, comprising a storage area for kitty litter to replenish kitty litter in the box;

a release mechanism for controlling when a predetermined amount of kitty litter in the storage area is release into the box, where the predetermined amount of kitty litter released with in response to cycling of the cleaning tool; and wherein the release mechanism includes an abutment which when contacted by the cleaning tool as it cycles through the kitty litter box causes the release mechanism to release the predetermined amount of kitty litter.

12. The device of claim 11 wherein the release mechanism also includes a release member which in its first position allows the predetermined amount of kitty litter to move from the storage area into the release member and in a second position allows the predetermined amount of kitty litter to move from the release member into a kitty litter box and where the release member is moved from its first position to second position due to contact of the cleaning tool with the abutment.

* * * * *